United States Patent [19]
Long et al.

[11] Patent Number: 5,238,329
[45] Date of Patent: Aug. 24, 1993

[54] MINE ROOF SUPPORT SYSTEM

[75] Inventors: Lawrence E. Long, Avon Lake, Ohio; Klaus M. Langeneckert, Naperville, Ill.; Gero Herrmann, Karlsfeld, Fed. Rep. of Germany

[73] Assignee: Dyckerhoff & Widmann AG of Munich, Fed. Rep. of Germany

[21] Appl. No.: 928,496

[22] Filed: Aug. 11, 1992

Related U.S. Application Data

[63] Continuation-in-part of Ser. No. 749,323, Aug. 23, 1991.

[51] Int. Cl.$^5$ .................. E21D 20/00; E21D 21/00
[52] U.S. Cl. .................. 405/288; 405/259.1; 405/303
[58] Field of Search .................. 405/288, 259.1, 259.5, 405/259.6, 302.1, 303

[56] References Cited

U.S. PATENT DOCUMENTS

| | | |
|---|---|---|
| 3,104,582 | 9/1963 | White . |
| 3,211,044 | 10/1965 | White . |
| 3,454,118 | 7/1969 | White .................. 175/289 |
| 3,505,824 | 4/1970 | White . |
| 3,509,726 | 5/1970 | White .................. 405/259.1 |
| 3,555,960 | 1/1971 | White . |
| 4,249,835 | 2/1981 | White .................. 405/259 |
| 4,596,496 | 6/1986 | Tyrell et al. .................. 405/288 |
| 4,601,616 | 7/1986 | Barish et al. .................. 405/288 |
| 4,666,344 | 5/1987 | Seegmiller .................. 405/259 |
| 4,699,547 | 10/1987 | Seegmiller .................. 405/288 |
| 4,749,310 | 6/1988 | White .................. 405/288 |
| 4,775,266 | 10/1988 | Seegmiller .................. 405/288 |
| 4,934,873 | 6/1990 | Calandra .................. 405/288 |
| 5,026,217 | 6/1991 | Seegmiller .................. 405/288 |

Primary Examiner—Dennis L. Taylor
Attorney, Agent, or Firm—Marshall, O'Toole, Gerstein, Murray & Borun

[57] ABSTRACT

A mine roof support system is disclosed having a connector. The connector has a first hole through which one end of a first roof supporting rod is inserted and a second hole through which one end of a second roof supporting rod is inserted. The first and second roof supporting rods are fastened to the connector so as to support the roof of the mine. In order to increase the bending arcs of the connector along which the first and second roof supporting rods bend without increasing the weight of the connector, the holes of the connector may be bevelled to form elliptical openings in the connector and the connector may be canted.

18 Claims, 5 Drawing Sheets

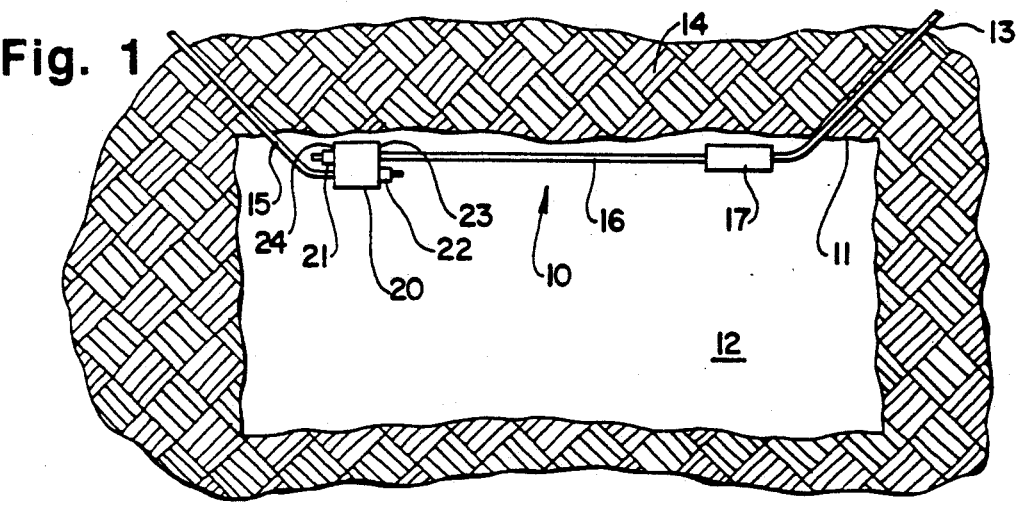
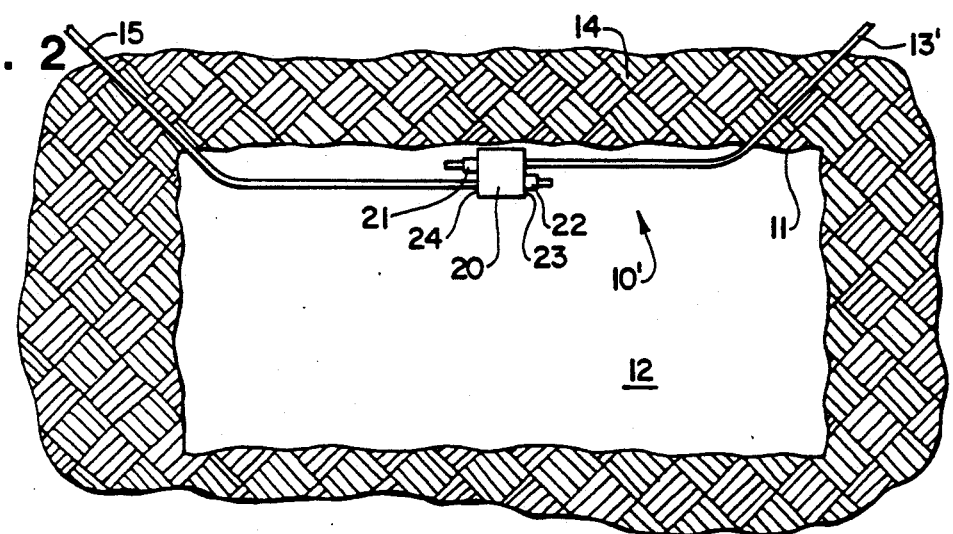
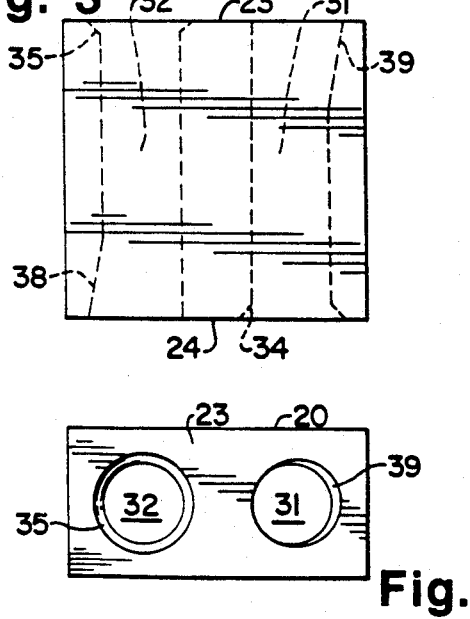
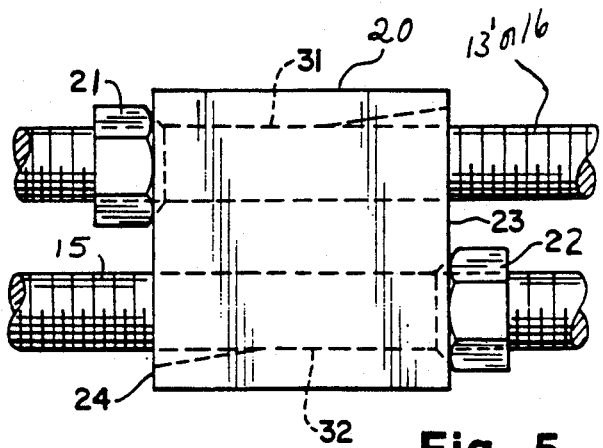

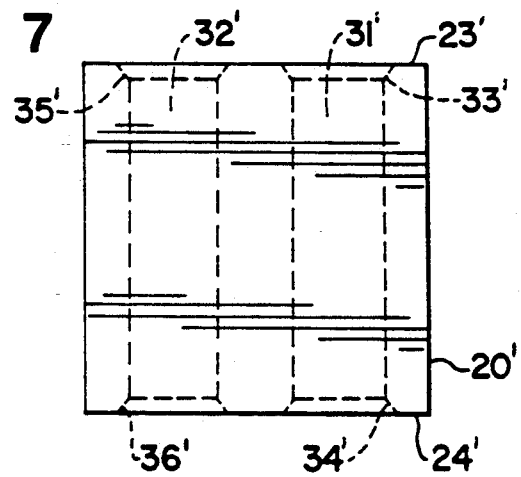
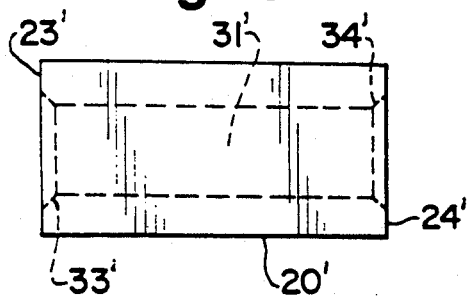
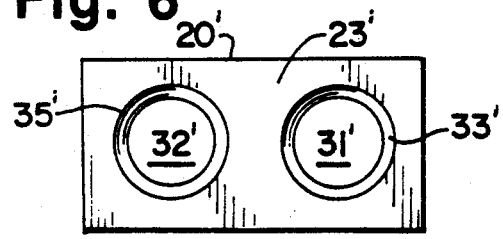

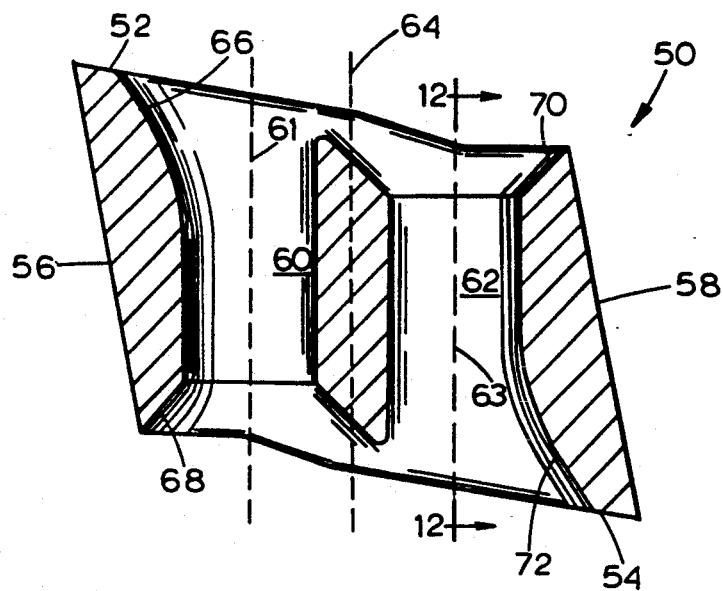
FIG. 10
FIG. 11
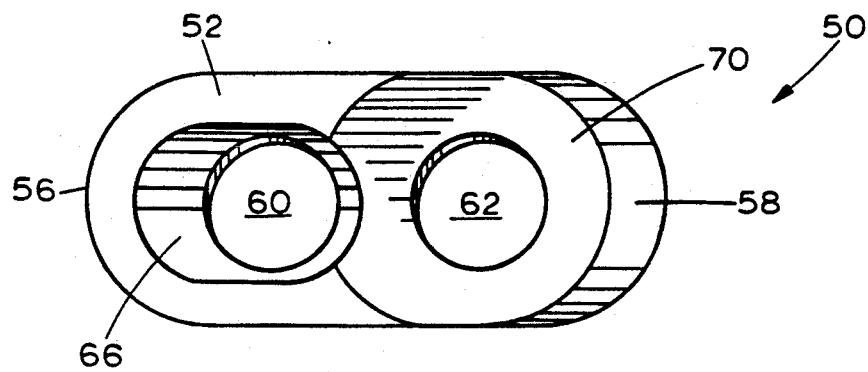
FIG. 12
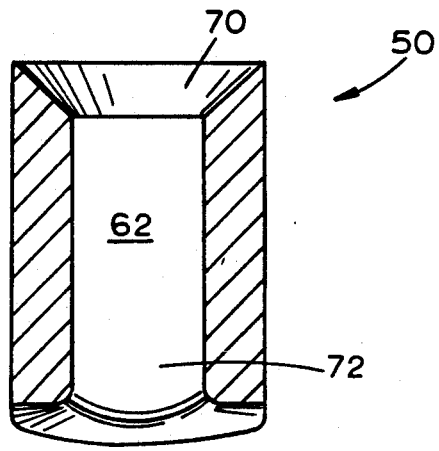

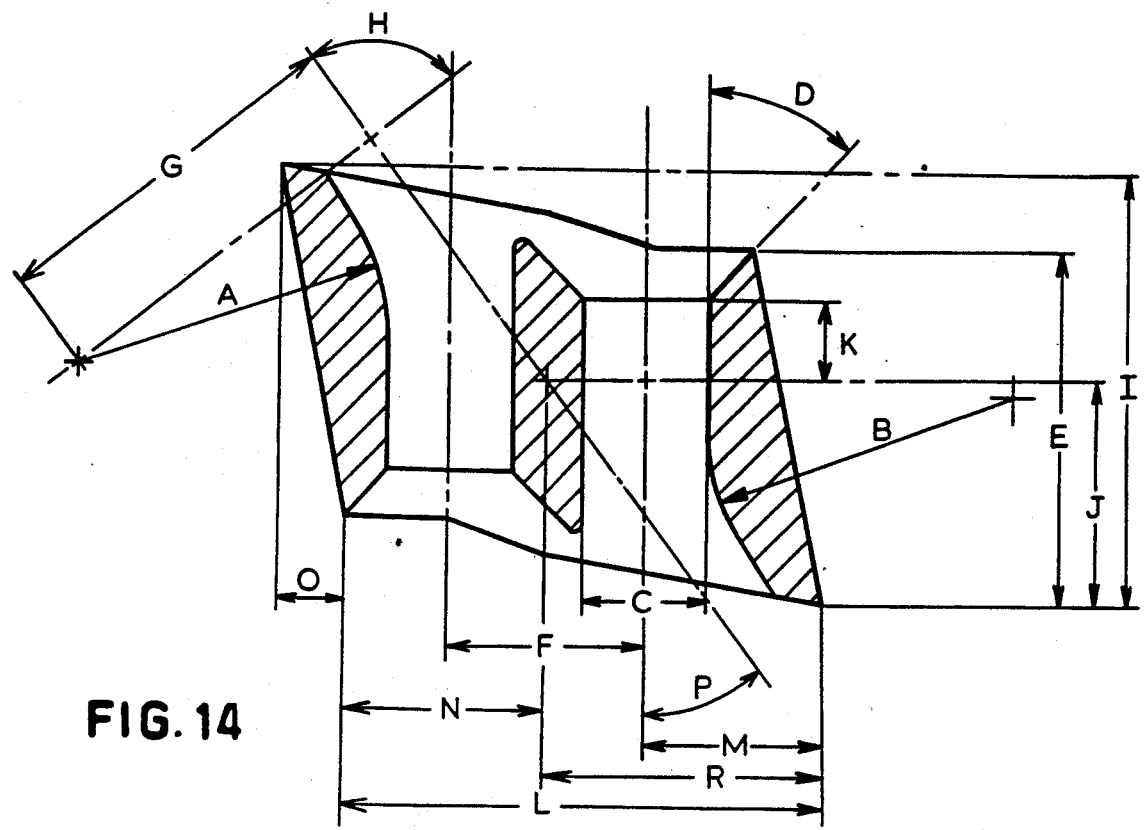
FIG. 14
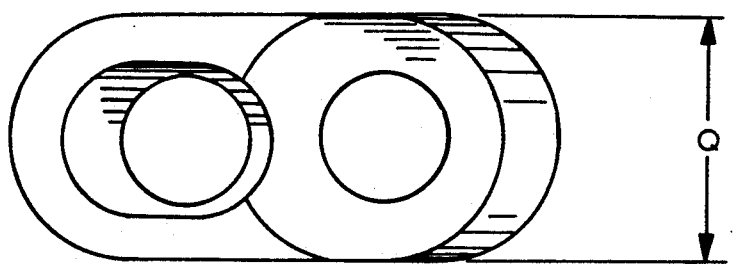
FIG. 15
FIG. 16
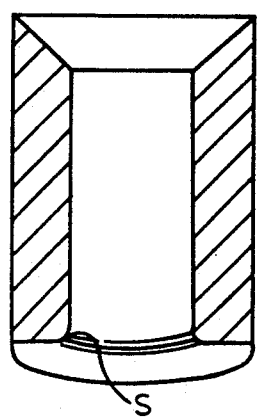

MINE ROOF SUPPORT SYSTEM

CROSS REFERENCE TO RELATED APPLICATION

This application is a continuation-in-part of application Ser. No. 07/749,323 filed on Aug. 23, 1991.

TECHNICAL FIELD OF THE INVENTION

The present invention relates to a mine roof support system for supporting the roof of a mine.

BACKGROUND OF THE INVENTION

There are numerous methods other than vertical or angled roof bolting for supporting the roof of an underground mine which is dug for the extraction of coal or other minerals or ores. One such method is the crossbar method wherein wood, steel, rail, fiberglass, or aluminum beams are placed against a mine roof. Each end of the beam can be supported by posts made from any of the materials used in making the beams or, in addition, from concrete. The crossbar method has the disadvantage that the posts can be accidentally knocked out by moving machinery, thus endangering the miners. To protect miners in such situations, cable or steel straps are bolted into the roof in order to support the beam should a post be knocked out. The beams can also be drilled and bolted directly to the roof. Installing crossbars is a slow and labor-intensive process, the materials are expensive, and installation can be hazardous. Moreover, wood is not a permanent material even if it is treated.

In another method, continuous bolt trusses are fabricated from angled roof bolts anchored into the roof by mechanical shells or adhesive resins. The bolts are connected by means of a tie-rod and tension is produced by a turnbuckle. Tie-rods or other length compensating devices are connected in sections of from two to five connecting rods. The tension in the bolts and tie-rods is essentially equal as they are continuously connected together. Tightening of the tie-rod turnbuckle can produce compressive forces in the roof rock which increases the strength of the rock. However, as the turnbuckle length or take-up is limited, the roof bolt holes must be precisely located or, otherwise, various lengths of tie-rods must be available to be connected to the roof bolts and turnbuckles in order to allow the truss system to be tensioned. The threads, which are cut or rolled into the ends of the roof bolts and tie-rods, act as stress concentration points and also reduce the effective area of the bolt/tie-rod, thus reducing the effective ultimate strength of the system. Fine machine threads are subject to damage, rust, and corrosion. Assembly of the continuous bolt multi-segment tie-rod truss system is time-consuming.

In a third method, multiple angled bolt trusses are fabricated by securing one end of each of two bolts at angles in the roof of the mine and by passing the other ends of the two bolts through plates or brackets such that each bolt is tensioned separately. Tie-rods, in two to five sections, are connected to the plates or brackets using turnbuckles or tensioning bolts and couplers such that the turnbuckles or tensioning bolts can tension the tie-rods. Since the tie-rods and bolts are tensioned separately, the compressive forces on the roof rock may be unequal. This may result in one bolt being overloaded close to failure while the tie-rod and opposite bolt have little or no stress. The roof bolt holes must be located at precise distances to allow tensioning within the limited range of a turnbuckle or tensioning bolt or else several sections of various lengths of tie-rods must be available to achieve the proper tie-rod length. The threads which are cut or rolled into the threaded ends of the roof bolts and tie-rods act as stress concentration points, and also reduce the effective area of the bolt/tie-rod thus reducing the effective ultimate strength of the truss system. Fine machine threads are subject to damage, rust, and corrosion. Assembly of the roof truss system is time-consuming.

In a fourth method, cable bolts or slings of lengths of wire rope are inserted into bore holes in the roof of a mine on either side of the mine passageway. Grout or grout cartridges are inserted into the holes in order to secure the cables to the mine roof. As each cable is one continuous piece, the tension in each cable can be equal in all segments. The cable or sling can be tensioned by attaching it to a split tube and by driving the split tube up into the cement-filled bore hole by a split tube driver which can be an air or hydraulic impact tool. However, variations in bore hole diameter due to drilling and/or rock movement hinder the passage of the split tube such that there is little control of the tension on the cable or sling. After installation, some cables have no tension and must be blocked with wood to the roof and tightened with wedges. Also, the tubes require special air or hydraulic jack legs which are not normal coal mining equipment, thus requiring an air compressor and air hoses laid to the work area. Moreover, the impact driving of the split tubes is slow and very noisy, and requires three operators to install a cable sling. Furthermore, impact driving of the split tubes can disturb the roof and ribs and may dislodge material thus endangering miners.

SUMMARY OF THE INVENTION

These disadvantages can be eliminated and/or minimized by the present invention. In one aspect of the invention, a roof support system for supporting a roof of a mine includes a first rod which extends generally along the roof of the mine and which is secured to a first bore in the roof. A second rod extends generally along the roof of the mine and is secured to a second bore in the roof. A connector connects the first and second rods together so as to support the roof of the mine. The connector has a connector body with first and second faces. The connector body has first and second holes extending from the first face to the second face. The first and second rods are inserted into the holes and secured to the connector. The first hole is partially bevelled to form a first elliptical opening in the first face and the second hole is partially bevelled to form a second elliptical opening in the second face. The first and second elliptical openings allow the first and second rods to bend in order to relieve strain on the roof support system.

In another aspect of the invention, a connector, which connects together two rods of a mine roof support system, has first and second sides, first and second faces, and first and second holes extending between the first and second faces. The first and second sides and the first and second faces form a generally canted connector body wherein the first side and the second face generally form an obtuse angle and wherein the first face and the second side generally form an obtuse angle. Each of the first and second holes has a center line intersecting the first and second faces at non-right angles. With this arrangement, the first and second holes are offset from one another in a direction along their center lines. The first hole forms a first opening in the first face and a second opening in the second face, and the second hole forms a third opening in the first face and a fourth opening in the second face. The first and fourth openings are elliptical.

In yet another aspect of the invention, this canted connector can be used in a roof support system wherein first and second rods, which are secured to bores in the roof of a mine, are also secured to the canted connector in roof supporting fashion. The first and fourth elliptical openings allow the first and second rods to bend so as to increase the load carrying capacity of the first and second rods.

In still another aspect of the invention, the first and second rods may be of unitary construction.

In a still further aspect of the invention, a roof support system for supporting a roof of a mine includes a first rod which extends generally along the roof of the mine and is secured to a first bore in the roof. A second rod extends generally along the roof of the mine and is secured to a second bore in the roof. A connector connects the first and second rods together so as to support the roof of the mine. The connector has a connector body with first and second faces. The connector body has a first hole extending from the first face to the second face and a second hole extending from the first face to the second face. A first rod is threadably secured within the first hole through the first face, and a second rod extends into the second hole through the second face and has an end exiting the second hole through the first face. A nut is threaded over the end of the second rod. The connector and the nut hold the first and second rods together in roof supporting fashion.

In the present invention, there is no need for multiple tie-rods. A single nut can be used for tensioning the whole system and the tension anywhere in the roof support system is equalized. The rods are made sufficiently long such that precise location of roof bolt holes is not required because the system can easily accommodate any excess rod extending through the connector. The roof truss system according to the present invention has few parts and is easier and faster to assemble, which is important because installation of a mine roof support system must follow as soon as possible after the extraction of rock, coal or other mineral, or ore in order to maintain roof rock strength and avoid roof falls.

BRIEF DESCRIPTION OF THE DRAWINGS

These and other features and advantages will become more apparent from a detailed consideration of the invention when taken in conjunction with the drawings in which:

FIG. 1 shows one arrangement of the roof truss system according to the present invention;

FIG. 2 shows another embodiment of a roof truss system according to the present invention;

FIGS. 3 and 4 illustrate one embodiment of a connector such as that used in FIGS. 1 and 2;

FIG. 5 shows the connector of FIGS. 3 and 4 attached to roof supporting rods;

FIGS. 6, 7 and 8 illustrate a second embodiment of a connector such as that used in FIGS. 1 and 2;

FIG. 10 is a cross-sectional view of another connector embodiment which can be used in the roof support systems shown in FIGS. 1 and 2;

FIG. 11 is an end view of the connector shown in FIG. 10;

FIG. 12 is a cross-sectional view taken along the lines 12—12 of FIG. 10;

FIGS. 14, 15 and 16, together with a table disclosed herein, show an exemplary set of dimensions for the connector shown in FIGS. 9-11.

DETAILED DESCRIPTION

Figure 9:
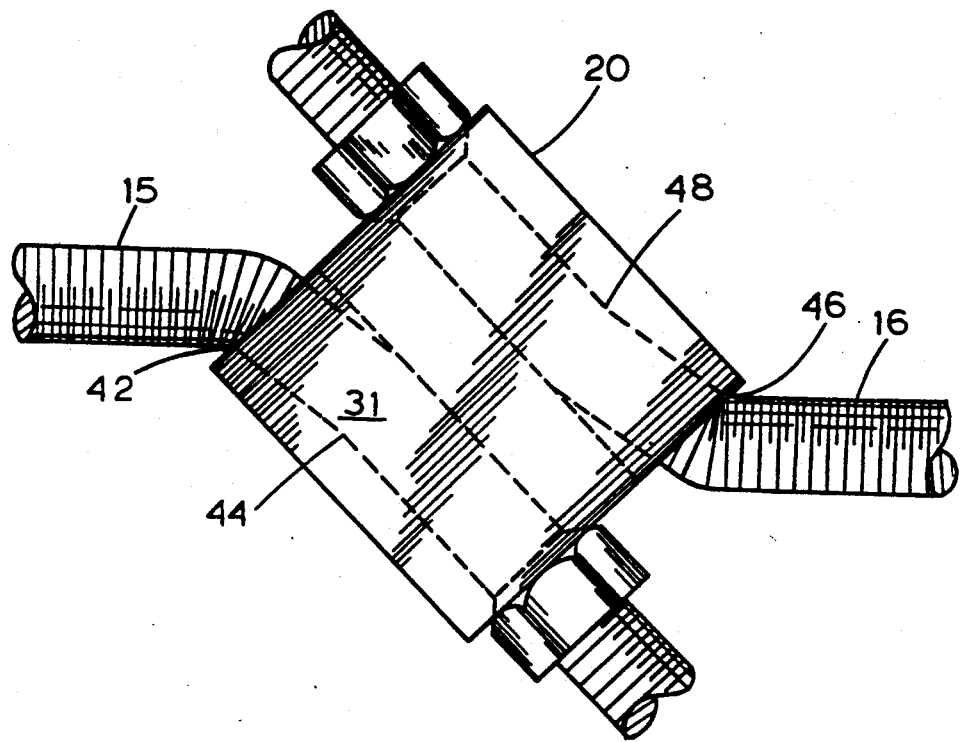
FIG. 9 shows the result of kinking of a rod fastened to the connector shown in FIGS. 3-8.

In FIG. 1, a roof truss system 10 supports a roof 11 of a passage 12 of a mine. A typical mine would incorporate a plurality of such roof truss systems 10 each separated by a predetermined distance from the system on either side of it. The roof truss system 10 includes a first rod 13 which is inserted into a bore formed at an angle through the roof 11 and into the roof rock 14. Any suitable means such as an anchor, epoxy resin, or cement can be used to retain the first rod 13 in its bore. A second rod 15 is inserted into a bore, spaced oppositely to the bore which receives the rod 13, formed at an angle through the roof 11 and into the roof rock 14. The second rod 15 may be of unitary construction; that is, the rod 15 may be a single rod. The second rod 15 can be secured within its bore by any suitable means such as an anchor, epoxy, or cement. The rod 13 is secured to a tie-rod 16 by a connector 17 such that the rod 13 and the tie-rod 16 are screwed into opposite ends of the connector 17. The other end of the tie-rod 16 is inserted into a first hole of a connector 20 through a first connector face 23. The tie-rod 16 can be secured to the connector 20 by any suitable mechanism such as threads within the first hole of the connector 20 or a nut 21. The second rod 15 is inserted into a second hole in the connector 20 through a second connector face 24 and has a threaded end which exits the connector 20 through the first face 23. A nut 22 is threaded over this threaded end and can be adjusted against the connector 20 in order to create the desired amount of tension in the rod 13, the rod 15 and the tie-rod 16. If a precise amount of tension is required, a torque wrench can be used for tightening the nut 22. The connector 17 can be replaced by a connector such as the connector 20.

In an alternative embodiment shown in FIG. 2, the tie-rod 16 and the connector 17 are eliminated and a rod 13' of extended length is used in their place. The rod 13' is secured to the connector 20 by inserting the rod 13' into the first hole of the connector 20 through the first face 23 such that a threaded end of the rod 13' exits the second face 24. The nut 21 is then threaded onto the threaded end of the rod 13'. The rod 13' can be of unitary construction. Otherwise, the construction of the roof truss system 10, is the same as that shown in FIG. 1.

The connector 20 is shown in more detail in FIGS. 3-5. The connector 20 has a first hole 31 extending through the connector 20 so that it creates openings in both the first face 23 and the second face 24. The connector 20 also has a second hole 32 extending through the connector 20 so that it creates openings in both the first face 23 and the second face 24. The hole 31 has a bevelled rim 34 in the second face 24 but an elliptical hole in the first face 23 forming a partially bevelled rim 39. Similarly, the hole 32 has a bevelled rim 35 in the first face 23 but an elliptical hole in the second face 24 forming a partially bevelled rim 38. The partially bevelled rims 38 and 39 allow bending of the rods fastened thereto and twisting of the roof truss system in order to relieve strain therein. The fully bevelled rims 34 and 35 accommodate spherical faces of the nuts 21 and 22.

As shown in FIG. 5, the rod 13' (or 16) is inserted through the first face 23, the hole 31, and exits the second face 24. The nut 21 is threaded onto the rod 13' (or 16). The rod 15 is inserted through the second face 24, the hole 32, and exits the first face 23. The nut 22 is threaded over the rod 15. Either nut can then be tightened to place the prescribed tension on the rods 15 and 13' (or 15 and 16).

As an alternative embodiment, a connector 20' is shown in more detail in FIGS. 6–8. The connector 20' has a first hole 31, extending through the connector 20' so that it creates openings in both a first face 23' and a second face 24'. The connector 20' also has a second hole 32' extending through the connector 20' so that it creates openings in both the first face 23' and the second face 24'. The hole 31' has a bevelled rim 33 in the first face 23' and a bevelled rim 34' in the second face 24'. Similarly, the hole 32' has a bevelled rim 35' in the first face 23' and a bevelled rim 36 in the second face 24'. These bevelled rims are provided for each hole in each face in order to allow the connector 20' to be a bidirectional device, to receive a spherical nut, and to facilitate twisting of the truss system in order to relieve strain.

The system according to this invention is simple having only five parts in the system shown in FIG. 2 and seven parts with respect to the system shown in FIG. 1. A single nut is adjusted for adjusting the tension in the entire system so that the tension will be equal everywhere in the roof support system. Precise location of the bore holes in the mine roof is not required since a deviation in the distance between the bore holes securing the rods 13 and 15 is accommodated by the amount of extra rod extending through the connector 20. Accordingly, rods of different length do not have to be inventoried, thus reducing cost.

Although FIGS. 1 and 2 do not show any supporting plates between the roof support system and the roof, it may be desirable to use such plates in order to provide contact between the roof support system 10 and the roof 11.

As shown in FIG. 9, the weight of the roof supported by the rods 15 and 16 creates tension therein. The tension in the rods 15 and 16 causes the connector 20 to rotate and the rods 15 and 16 to bend with respect to the connector 20. The rod 15 bends along a surface of the wall defining the hole 31 between points 42 and 44. This surface between the points 42 and 44 may be curved, if desired, with a radius to define a bending radius for the rod 15 as it bends between the points 42 and 44. This surface of the wall defining the hole 31 between the points 42 and 44 is defined as the bending arc provided by the connector 20 for the rod 15. The connector 20 provides a similar bending arc for the rod 16 between points 46 and 48.

As long as the rods 15 and 16 are straight, any tension in these rods is, for the most part, distributed evenly across the cross-sections thereof. However, if the tension in the rods 15 and 16 increases sufficiently, the connector 20 rotates and the rods 15 and 16 bend around the points 42 and 46 of the connector 20. As the rods 15 and 16 bend around the points 42 and 46, the tension in the rods 15 and 16 is no longer distributed evenly across the cross-sections of the rods; instead, stress is concentrated in the rods 15 and 16 near the points 42 and 46. If this stress in the rods 15 and 16 is great enough, kinks form therein at the points 42 and 46. The kinks at the points 42 and 46 can result in the premature fracturing and failure of the rods 15 and 16.

The degree to which stress is concentrated in the rods 15 and 16 near the points 42 and 46 and, thus, the likelihood that kinks will form in the rods 15 and 16 depends upon the length of the bending arcs and the aforementioned bending radii provided for the rods 15 and 16 by the connector 20 between the points 42 and 44 and between the points 46 and 48. Longer bending arcs and larger bending radii result in less concentration of stress than do shorter bending arcs and smaller bending radii. Therefore, the likelihood that kinks will form in the rods 15 and 16 can be reduced by increasing the length of the bending arcs and of the bending radii between the points 42 and 44 and between the points 46 and 48. The length of these bending arcs associated with the rectangular connector 20 can be increased by increasing the size of the connector 20. However, increasing the size of the connector 20 results in an undesirable increase in the weight of the connector 20.

The connector 50 shown in FIGS. 10–12, on the other hand, increases the length of the bending arcs for the rods attached thereto without a substantial increase in weight. Accordingly, the connector 50 has a first face or end 52 and a second face or end 54. The connector 50 also has a first side 56 and a second side 58. As viewed in FIG. 10, the angles between the face 52 and the side 56 and between the face 54 and the side 58 are acute. Similarly, the angles between the face 52 and the side 58 and between the face 54 and the side 56 are obtuse. Thus, the connector 50 is canted or skewed as compared to the rectangular connector 20 and, in the preferred embodiment shown in FIGS. 10–12, the connector 50 is generally in the shape of a rhomboid in cross-section. This canted shape of the connector 50 contributes to a longer bending arc for the rods fastened thereto without a substantial increase in weight as compared to the primarily rectangular connector 20.

A pair of holes 60 and 62 of the connector 50 extend through the connector 50 between the first face 52 and the second face 54. The holes 60 and 62 have corresponding center lines 61 and 63 which intersect the faces 52 and 54 at non-right angles. The center lines 61 and 63 are generally parallel to an axis 64 of the connector 50. As is seen in FIG. 10, because of the canted shape of the connector 50 and the orientation of the holes 60 and 62 within the connector 50, the holes 60 and 62 are offset with respect to one another along the direction of the axis 64 (i.e. along the direction of the center lines 61 and 63 of the holes 60 and 62).

The hole 60 has a partially bevelled rim or surface 66 adjacent the face 52 and a substantially fully bevelled rim 68 adjacent the face 54. Similarly, the hole 62 has a substantially fully bevelled rim 70 adjacent the face 52 and a partially bevelled rim or surface 72 adjacent the face 54. As can be seen in FIG. 11, the partially bevelled surface 66 of the hole 60 results in the opening formed by the hole 60 in the face 52 of the connector 50 having a generally elliptical appearance. Similarly, the partially bevelled surface 72 of the hole 62 results in the opening formed by the hole 62 in the face 54 of the connector 50 having a generally elliptical appearance. Also, as can be seen in FIG. 11, the substantially fully bevelled rim 70 of the hole 62 results in the opening formed by the hole 62 in the face 52 of the connector 50 having a generally circular appearance. Similarly, the substantially fully bevelled rim 68 of the hole 60 results in the opening formed by the hole 60 in the face 54 of the connector 50 having a generally circular appearance.

Figure 13:
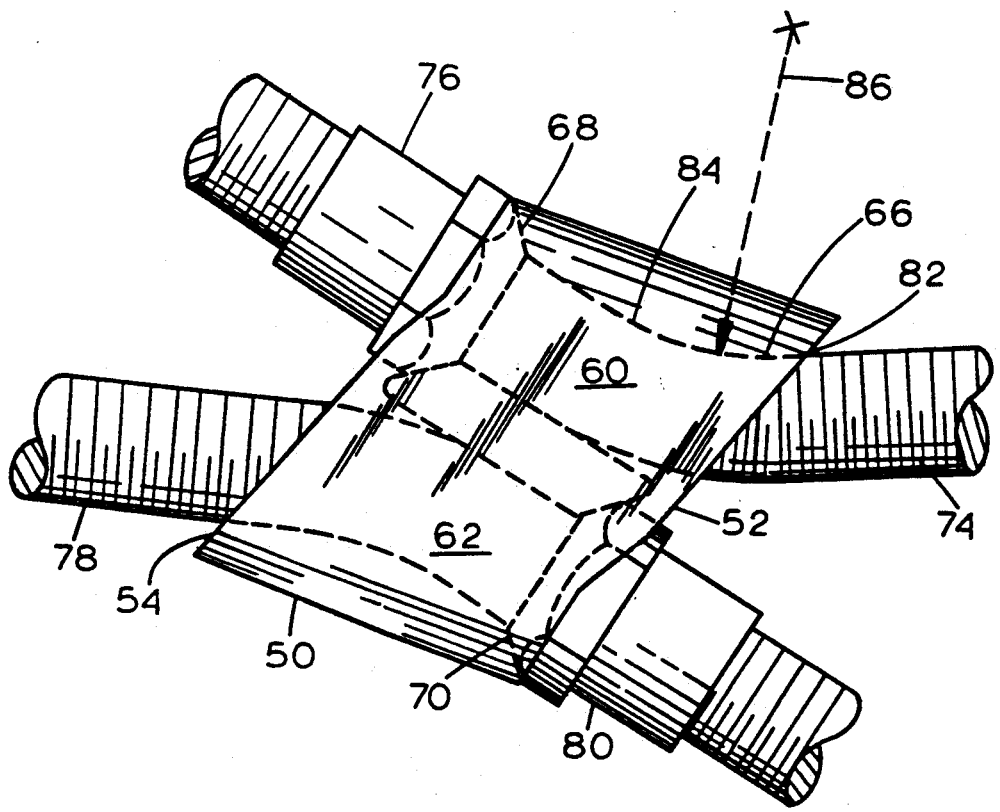
FIG. 13 shows the longer bending arc for a rod fastened to the connector shown in FIGS. 9-11.

The connector 50 can be used in a manner similar to the previously described connectors. That is, as shown in FIG. 13, a first roof supporting rod 74 is inserted through the first face 52 and through the hole 60 so that a threaded end of this first rod 74 exits the hole 60 through the second face 54. A first nut 76 may be threaded over the threaded end of the first rod 74 which exits the hole 60 through the second face 54. The bevelled rim 68 accommodates a spherical head on the first nut 76. A second roof supporting rod 78 is inserted through the second face 54 and through the hole 62 so that a threaded end of this second rod 78 exits the hole 62 through the first face 52. A second nut 80 may be threaded over a threaded end of the second rod 78 which exits the hole 62 through the first face 52. The bevelled rim 70 accommodates a spherical head on the second nut 80. One or both of the nuts 76 and 80 may be tightened with respect to the other in order to put a predetermined amount of tension on the roof supporting rods 74 and 78.

As shown in FIG. 13, the bending arc for the rod 74 fastened to the connector 50 extends along the bevelled surface 66 between points 82 and 84. The bevelled surface 66 of the hole 60 between the points 82 and 84 may be curved with a radius 86. The bending arc for the rod 78 may be substantially the same length as the length of the bending arc for the rod 74 and the bevelled surface 72 of the hole 62 may be curved with a radius similar to the radius 86. These bending arcs provided by the connector 50 allow the rods 74 and 78 to bend smoothly along the partially bevelled rims or surfaces 66 and 72 of the holes 60 and 62 as the connector 50 rotates with respect to the rods 74 and 78 due to tension in the rods 74 and 78.

The lengths of these bending arcs are determined by the amount of canting of the connector 50 (i.e. the amount of the aforementioned offset between the holes 60 and 62 of the connector 50). This canting of the connector 50 allows longer bending arcs than the bending arcs of the connector 20 without a substantial increase in connector weight. The longer bending arcs of the connector 50 allow the connector 50 to distribute the tension on the rods 74 and 78 across a greater portion of the cross-section of these rods than is the case with the connector 20. The longer bending arcs, therefore, reduce the likelihood of kinking in the rods 74 and 78 and, as a result, a greater portion of the load carrying capacity of the rods fastened to the connector 50 is used.

The table below shows exemplary values for the dimensions of the connector 50 identified in FIGS. 14-16. These dimensions are exemplary only and should not be considered as limiting the scope of the invention. In the table, the first column identifies the dimensions indicated by the reference letters in FIGS. 16-18, the second column specifies the exemplary values of the dimensions in inches (unless otherwise noted), and the third column specifies the exemplary values of the dimensions in millimeters. The dimensions A and B are the radii of curvature of the partially surfaces 66 and 72 while the dimension S is the radius of the indicated surface of the connector 50.

TABLE

| Reference Letter | Dimension | |
|---|---|---|
| A | 3.5 | (88.9) |
| B | 3.5 | (88.9) |
| C | 1.312 | (33.3) |
| D | 45° | |
| E | 3.607 | (91.6) |
| F | 2.0 | (50.8) |
| G | 4.085 | (103.8) |
| H | 90° | |
| I | 4.512 | (114.6) |
| J | 2.256 | (57.3) |
| K | 0.925 | (23.5) |
| L | 4.919 | (124.9) |
| M | 1.839 | (46.7) |
| N | 2.082 | (52.9) |
| O | 0.758 | (19.3) |
| P | 38.9° | |
| Q | 2.5 | (63.5) |
| R | 2.837 | (72.1) |
| S | 0.2 | (5.1) |

Many embodiments, modifications and variations have been shown herein and many more are possible in light of the above teachings. For example, the connector 50 may have a shape other than a rhomboid (such as a rhombus or any other parallelogram) as long as the connector 50 is canted to allow the holes 60 and 62 to be offset sufficiently to increase the bending radius of the rods connected thereto. Therefore, it is to be understood that the invention may be practiced otherwise than as specifically described.

What is claimed is:

1. A roof support system for supporting a roof of a mine, the roof having first and second bores therein, the roof support system comprising:
   a first rod extending generally along the roof of the mine;
   means for securing the first rod to the first bore;
   a second rod extending generally along the roof of the mine;
   means for securing the second rod to the second bore;
   connecting means for connecting the first and second rods together so as to support the roof of the mine, the connecting means having a connector body with first and second faces, the connector body having first and second holes extending from the first face to the second face, wherein the first hole is partially bevelled to form a first elliptical opening in the first face and the second hold is partially bevelled to form a second elliptical opening in the second face, the first and second elliptical openings allowing the first and second rods to bend in order to relieve strain on the roof support system, wherein the connector body is generally canted, and wherein each of the holes has a center line which intersects the first and second faces at non-right angles, the first and second holes being substantially parallel to one another such that the first and second holes are offset from one another in a direction along their center lines; and,
   securing means for securing the first and second rods to the connecting means.

2. The roof support system of claim 1 wherein the first rod extends into the first hole through the first face and has an end exiting the first hole through the second face, wherein the second rod extends into the second hole through the second face and has an end exiting the second hole through the first face, and wherein the securing means comprises a first nut threaded over the end of the first rod and a second nut threaded over the end of the second rod, the connecting means and the first and second nuts holding the first and second rods together in roof supporting fashion.

3. The roof support system of claim 2 wherein the first hole is substantially fully bevelled to form a first substantially circular opening in the second face, wherein the second hole is substantially fully bevelled to form a second substantially circular opening in the first face, and wherein each of the first and second nuts has a spherical end engaging a respective one of the first and second substantially circular openings.

4. The roof support system of claim 1 wherein the first hole is substantially fully bevelled to form a first substantially circular opening in the second face, and wherein the second hole is substantially fully bevelled to form a second substantially circular opening in the first face.

5. The roof support system of claim 1 wherein the first and second rods are each of unitary construction.

6. A connector for connecting together two rods of a mine roof support system, the connector comprising first and second sides, first and second faces, and first and second holes extending between the first and second faces, the first and second sides and the first and second faces forming a generally canted connector body wherein the first side and the second face generally form an obtuse angle and wherein the first face and the second side generally form an obtuse angle, the first and second holes each having a center line intersecting the first and second faces at non-right angles, the first and second holes being offset from one another in a direction along the center lines, the first hole forming a first opening in the first face and a second opening in the second face, the second hole forming a third opening in the first face and a fourth opening in the second face, the first and fourth openings being elliptical.

7. The roof support system of claim 6 wherein the second and third openings are substantially circular.

8. The roof support system of claim 7 wherein a surface of the first hole is bevelled at the first face at a radius of about 3.5 inches (or about 88.9 millimeters), and a surface of the second hole is bevelled at the second face at a radius of about 3.5 inches (or about 88.9 millimeters).

9. A roof support system for supporting a roof of a mine, the roof having first and second bores therein, the roof support system comprising:
a first rod extending generally along the roof of the mine;
means for securing the first rod to the first bore;
a second rod extending generally along the roof of the mine;
means for securing the second rod to the second bore;
connecting means for connecting the first and second rods together so as to support the roof of the mine, the connecting means having first and second sides, first and second faces, and first and second holes extending between the first and second faces, the first and second sides and the first and second faces forming a generally canted connector body wherein the first side and the second face generally form an obtuse angle and wherein the first face and the second side generally form an obtuse angle, the first and second holes each having a center line intersecting the first and second faces at non-right angles, the first and second holes being offset from one another in a direction along the center lines, the first hole forming a first opening in the first face and a second opening in the second face, the second hole forming a third opening in the first face and a fourth opening in the second face, the first and fourth openings being elliptical; and,
securing means for securing the first and second rods to the connecting means.

10. The roof support system of claim 9 wherein the first rod extends into the first hole through the first face and has an end exiting the first hole through the second face, wherein the second rod extends into the second hole through the second face and has an end exiting the second hole through the first face, and wherein the securing means comprises a first nut threaded over the end of the first rod and a second nut threaded over the end of the second rod, the connecting means and the first and second nuts holding the first and second rods together in roof supporting fashion.

11. The roof support system of claim 10 wherein the second opening is substantially circular, wherein the third opening is substantially circular, and wherein each of the first and second nuts has a spherical end engaging a respective one of the second and third openings.

12. The roof support system of claim 9 wherein the first rod extends into the first hole through the first face and has an end exiting the first hole through the second face, and wherein the securing means comprises a nut threaded over the end of the first rod, the nut and the connecting means holding the first and second rods together in roof supporting fashion.

13. The roof support system of claim 9 wherein the first and second rods are each of unitary construction.

14. A roof support system for supporting a roof of a mine, the roof having first and second bores therein, the roof support system comprising:
a first rod extending generally along the roof of the mine;
means for securing the first rod to the first bore;
a second rod extending generally along the roof of the mine;
means for securing the second rod to the second bore;
connecting means for connecting the first and second rods together so as to support the roof of the mine, the connecting means having a connector body with first and second faces, the connector body having a first hole extending from the first face to the second face and a second hole extending from the first face to the second face, the first rod being threadably secured within the first hole through the first face, the second rod extending into the second hole through the second face and having an end exiting the second hole through the first face, wherein the connector body is canted, and wherein each of the holes has a center line which intersects the first and second faces at non-right angles, the first and second holes being substantially parallel to one another such that the first and second holes are offset from one another in a direction along their center lines; and,
a nut threaded over the end of the second rod wherein the connecting means and the nut hold the first and second rods together in roof supporting fashion.

15. The roof support system of claim 14 wherein the second hole is substantially fully bevelled to form a substantially circular opening in the first face, and wherein the nut has a spherical end engaging the substantially circular opening.

16. The roof support system of claim 14 wherein the first hole is threaded.

17. The roof support system of claim 14 wherein the first rod is threaded.

18. The roof support system of claim 14 wherein the first hole is partially bevelled to form a first elliptical opening in the first face, wherein the second hole is substantially fully bevelled to form a substantially circular opening in the first face, and wherein the second hole is partially bevelled to form a second elliptical opening in the second face.

* * * * *